US012660055B2

(12) United States Patent
Niioka

(10) Patent No.: US 12,660,055 B2
(45) Date of Patent: Jun. 16, 2026

(54) LIGHTING APPARATUS, DRIVING METHOD OF LIGHTING APPARATUS, AND VEHICLE LAMP

(71) Applicant: Stanley Electric Co., Ltd., Tokyo (JP)

(72) Inventor: Hidenobu Niioka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 188 days.

(21) Appl. No.: 18/711,397

(22) PCT Filed: Oct. 24, 2022

(86) PCT No.: PCT/JP2022/039452
§ 371 (c)(1),
(2) Date: Oct. 8, 2024

(87) PCT Pub. No.: WO2023/090058
PCT Pub. Date: May 25, 2023

(65) Prior Publication Data
US 2025/0331079 A1    Oct. 23, 2025

(30) Foreign Application Priority Data

Nov. 22, 2021    (JP) ................................. 2021-189505

(51) Int. Cl.
*H05B 45/20*        (2020.01)
*H05B 45/325*       (2020.01)
(Continued)

(52) U.S. Cl.
CPC ........... *H05B 45/20* (2020.01); *H05B 45/325* (2020.01); *H05B 45/345* (2020.01); *B60Q 1/28* (2013.01);
(Continued)

(58) Field of Classification Search
CPC ........ H05B 45/10; H05B 45/20; H05B 45/30; H05B 45/325; H05B 45/345; B60Q 1/28; B60Q 2400/20; B60Q 2400/30
See application file for complete search history.

(56) References Cited

U.S. PATENT DOCUMENTS

2016/0081145 A1*  3/2016  Peeters ................... A01G 9/20
                                                        315/185 R
2018/0116021 A1*  4/2018  Jin .................... H01L 23/49811

FOREIGN PATENT DOCUMENTS

JP          6151523 B2      6/2017

OTHER PUBLICATIONS

International Search Report and Written Opinion mailed on Nov. 22, 2022, received for PCT Application PCT/JP2022/039452, filed on Oct. 24, 2022, 8 pages including English Translation.

* cited by examiner

*Primary Examiner* — Jimmy T Vu
(74) *Attorney, Agent, or Firm* — XSENSUS LLP

(57)                ABSTRACT

A lighting apparatus includes: a first light emitting element; a second light emitting element whose emission color is different from that of the first light emitting element; a power supply circuit connected to and supplies a driving voltage to the light emitting elements; and a control circuit configured to control flow of a current generated by the drive voltage to each light emitting element, and to control the flow of the current such that, during a first period, a first current flows through the first light emitting element while the second light emitting element is in a non-conductive state, and during a second period, a second current smaller than the first current flows through the first light emitting element while a third current flows through the second light emitting element.

7 Claims, 6 Drawing Sheets

(51) Int. Cl.
   *H05B 45/345*          (2020.01)
   *B60Q 1/28*            (2006.01)
(52) U.S. Cl.
   CPC ...... *B60Q 2400/20* (2013.01); *B60Q 2400/30*
                                        (2013.01)

LIGHTING APPARATUS, DRIVING METHOD OF LIGHTING APPARATUS, AND VEHICLE LAMP

CROSS-REFERENCE TO RELATED APPLICATIONS

The present application is based on PCT filing PCT/JP2022/039452, filed Oct. 24, 2022, which claims priority from Japanese Patent Application No. 2021-189505, filed Nov. 22, 2021, the entire contents of each are incorporated herein by reference.

TECHNICAL FIELD

The present disclosure relates to a lighting apparatus, a driving method of the lighting apparatus, and a vehicle lamp.

BACKGROUND ART

Japanese Patent No. 6151523 (Patent Document 1) discloses a drive circuit which includes a DC-DC converter that applies a DC voltage to a light emitting part in which a plurality of semiconductor light emitting elements are connected in series, and a constant current source that is connected in parallel to at least one semiconductor light emitting element among the plurality of semiconductor light emitting elements, where the drive circuit is configured to cause a relatively low idle current to flow through the semiconductor light emitting element connected in parallel to the constant current source during a period when the constant current source is turned on.

However, during the period when an idle current is flowing through some (at least one) of the plurality of semiconductor light emitting elements, there is a possibility that emission color of this semiconductor light emitting element fluctuates, and as the entire light emitting part, discoloration of the color tone of the emitted light may occur.

PRIOR ART DOCUMENT

Patent Document

[Patent Document 1] Japanese Patent No. 6151523

SUMMARY OF THE INVENTION

Technical Problem

In a specific aspect, it is an object of the present disclosure to suppress discoloration of the color tone of the emitted light in a lighting apparatus or the like using a light emitting element.

Solution to the Problem (1) A lighting apparatus according to one aspect of the present disclosure is a lighting apparatus including: (a) at least one first light emitting element; (b) at least one second light emitting element whose emission color is different from that of the first light emitting element; (c) a power supply circuit connected to the first light emitting element and the second light emitting element and supplies a driving voltage to the first light emitting element and the second light emitting element; and (d) a control circuit that controls flow of a current generated by the drive voltage to each of the first light emitting element and the second light emitting element; (e) where the control circuit controls the flow of the current such that, during a first period, a first current flows through the first light emitting element while the second light emitting element is in a non-conductive state, and controls the flow of the current such that, during a second period which follows the first period, a second current relatively smaller than the first current flows through the first light emitting element while a third current flows through the second light emitting element.

(2) A driving method of a lighting apparatus according to one aspect of the present disclosure is (a) a driving method of a lighting apparatus configured to include at least one first light emitting element and at least one second light emitting element whose emission color is different from that of the first light emitting element, (b) where the driving method controls a flow of a current such that, during a first period, a first current flows through the first light emitting element while the second light emitting element is in a non-conductive state, and (c) controls a flow of a current such that, during a second period which follows the first period, a second current relatively smaller than the first current flows through the first light emitting element while a third current flows through the second light emitting element.

(3) A vehicle lamp according to one aspect of the present disclosure is a vehicle lamp configured using the lighting apparatus according to the above-described (1).

According to the above configurations, it is possible to suppress discoloration of the color tone of the emitted light in a lighting apparatus or the like using a light emitting element.

MODE FOR CARRYING OUT THE INVENTION

Figure 1:
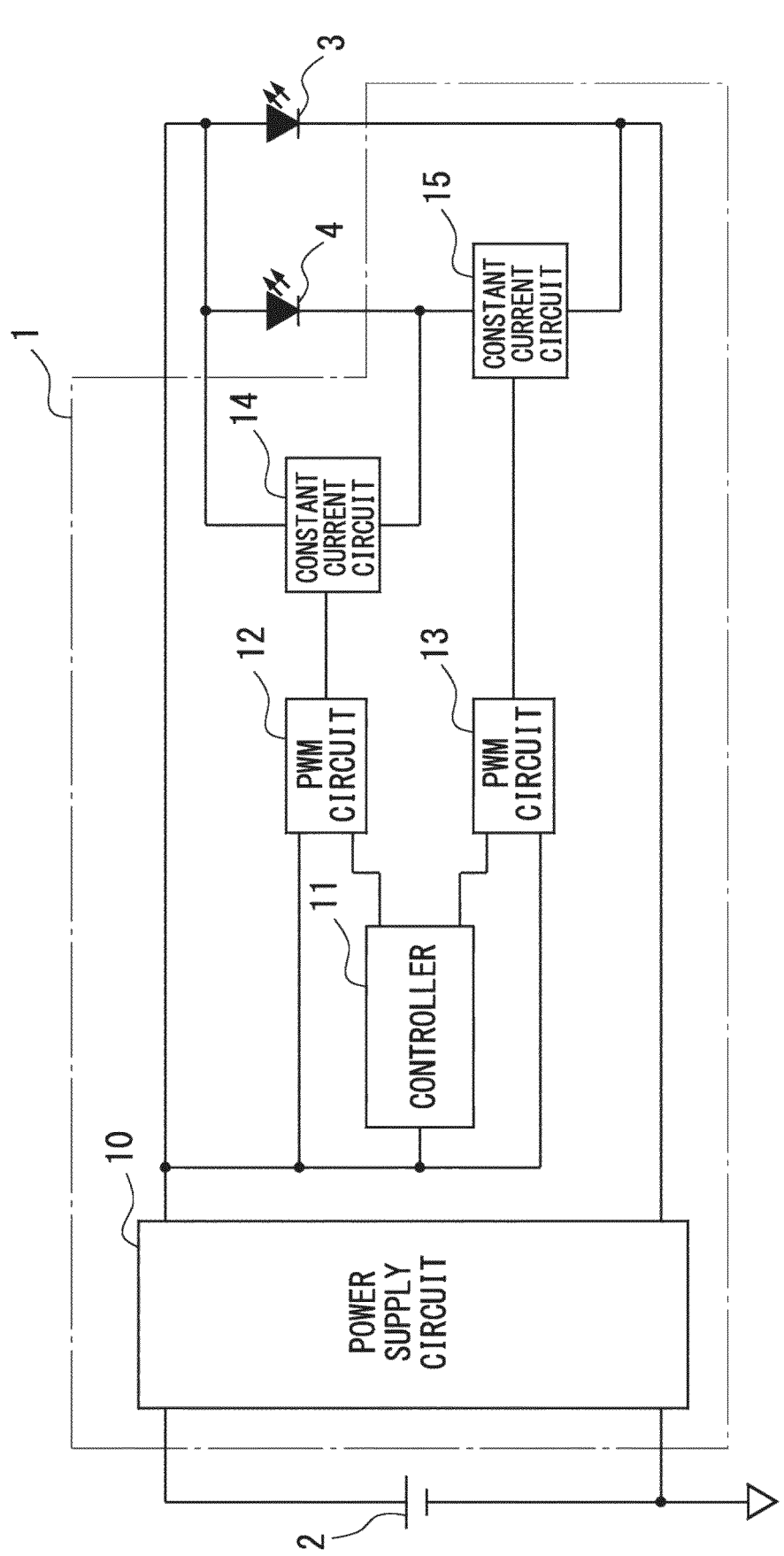
FIG. 1 is a block diagram showing the configuration of a vehicle lamp according to one embodiment.

FIG. 1 is a block diagram showing the configuration of a vehicle lamp according to one embodiment. The illustrated vehicle lamp is a type of lighting apparatus, and is installed in a vehicle used as a vehicle width lamp, a daylight (daytime running light) or the like, for example. This vehicle lamp is configured to include a drive circuit 1 that receives power supply from a power source 2 such as a vehicle battery and generates a drive voltage, and light emitting elements 3 and 4 that operate by the drive voltage generated by the drive circuit 1.

The drive circuit 1 is configured to include a power supply circuit 10, a controller 11, two PWM circuits 12 and 13, and two constant current circuits 14 and 15. Here, note that the PWM circuits 12 and 13 correspond to a first pulse generating circuit and a second pulse generating circuit respectively, and a pulse signal supply circuit is configured including these and the controller 11.

The power supply circuit 10 is connected to each of the light emitting elements 3 and 4, generates a driving voltage for each of the light emitting elements 3 and 4 using the DC voltage supplied from the power supply 2, and supplies the driving voltage to each of the light emitting elements 3 and 4. As this power supply circuit 10, a step-up type, a step-down type, or a buck-boost type DC-DC converter can be used, for example.

The controller 11 is connected to the power supply circuit 10 and the PWM circuits 12 and 13, and is configured to operate in response to the voltage generated by the power supply circuit 10, and to control the operation of the PWM circuits 12 and 13. This controller 11 can be configured using a microcomputer including a processor or an FPGA, for example.

The PWM circuit 12 is connected to the power supply circuit 10, the controller 11, and the constant current circuit 14, and generates a pulse signal for switching on/off of constant current generation operation by the constant current circuit 14.

The PWM circuit 13 is connected to the power supply circuit 10, the controller 11, and the constant current circuit 15, and generates a pulse signal for switching on/off of constant current generation operation by the constant current circuit 15.

The constant current circuit 14 is connected to the PWM circuit 12 and is connected in parallel to the light emitting element 4, and turns on (generation) and turns off (non-generation) the constant current generation operation according to the pulse signal supplied from the PWM circuit 12.

The constant current circuit 15 is connected to the PWM circuit 13 and is connected in series to the light emitting element 4, and turns on (generation) and turns off (non-generation) the constant current generation operation according to the pulse signal supplied from the PWM circuit 13. In more detail, the constant current circuit 15 is connected to one end (cathode) of the light emitting element 4. And a series circuit consisting of this light emitting element 4 and the constant current circuit 15 is connected in parallel to the light emitting element 3.

The light emitting element 3 is a semiconductor light emitting element such as an LED (Light Emitting Diode), for example, and is connected to the power supply circuit 10, and is operated by a drive voltage supplied from the power supply circuit 10 to emit light. In this embodiment, the light emitting element 3 is a white LED that emits white color light, and is configured to include a blue LED and a phosphor that partially converts the light emitted from the blue LED to a yellow color emission, and mixes the emission from the blue LED and the emission from the phosphor to create pseudo white color light.

The light emitting element 4 is a semiconductor light emitting element such as an LED (Light Emitting Diode), for example, and is connected to the power supply circuit 10, and is operated by a drive voltage supplied from the power supply circuit 10 to emit light. In this embodiment, the light emitting element 4 emits light of a different emission color from that of the light emitting element 3, and is a blue LED that emits blue color light, for example.

As illustrated in the figure, the light emitting element 3 and the light emitting element 4 are connected in parallel to each other, and one end (anode) of each element is connected to a high potential end of the power supply circuit 10. The other end (cathode) of the light emitting element 3 is connected to a reference potential end (low potential end), and the other end (cathode) of the light emitting element 4 is connected to a reference potential end via the constant current circuit 15.

Figure 2:
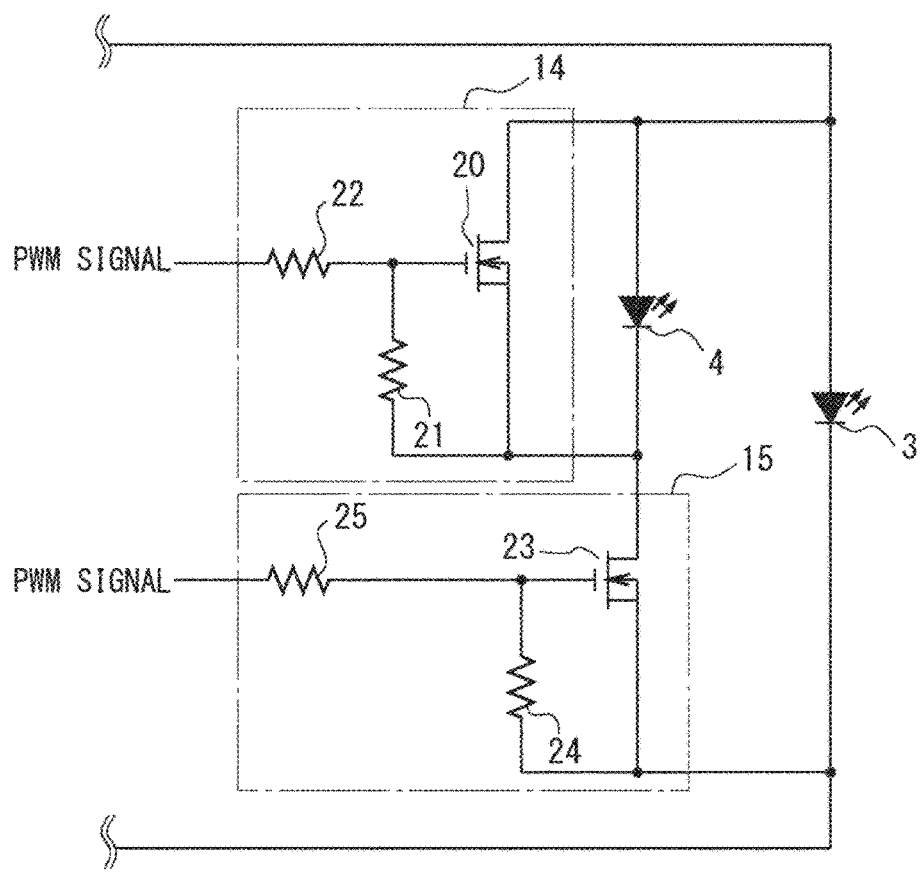
FIG. 2 is a circuit diagram showing a configuration example of each constant current circuit.

FIG. 2 is a circuit diagram showing a configuration example of each constant current circuit. The constant current circuit 14 in the illustrated example is configured to include a field effect transistor 20 connected in parallel to the light emitting element 4, a resistance element 21 connected between one of the current input/output terminals (source/drain) and the control terminal (gate) of this field effect transistor 20, and a resistance element 22 connected between the control terminal of the field effect transistor 20 and the PWM circuit 12. This constant current circuit 14 receives a pulse signal (a PWM signal) from the PWM circuit 12 to control "on" (conductive state) and "off" (non-conductive state) of the field effect transistor, and when it is "on", a constant current flows, and when it is "off", current will not flow.

Further, the constant current circuit 15 is configured to include a field effect transistor 23 connected in series to the light emitting element 4, a resistance element 24 connected between one of the current input/output terminals (source/drain) and the control terminal (gate) of this field effect transistor 23, and a resistance element 25 connected between the control terminal of the field effect transistor 23 and the PWM circuit 13. This constant current circuit 15 receives a pulse signal (PWM signal) from the PWM circuit 13 to control "on" (conductive state) and "off" (non-conductive state) of the field effect transistor, and when it is "on", a constant current flows, and when it is "off", current will not flow.

Figure 3:
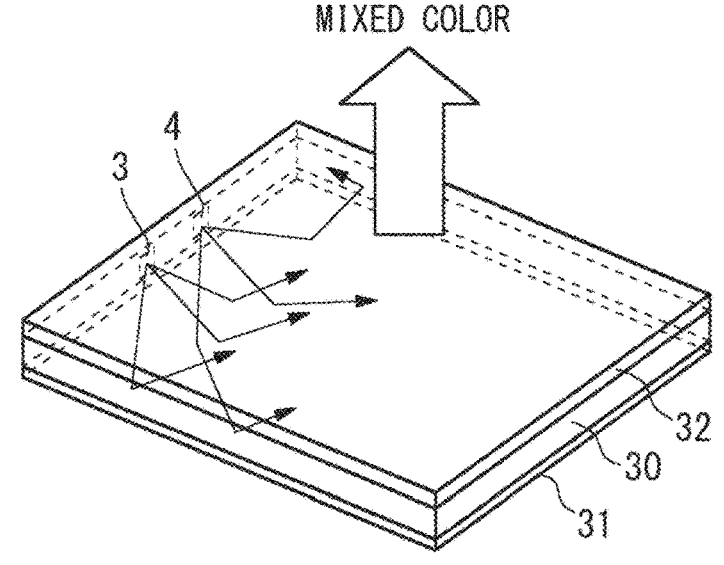
FIG. 3 is a schematic perspective view showing a configuration example of a light emitting body configured to include each light emitting element.

FIG. 3 is a schematic perspective view showing a configuration example of a light emitting body configured to include each light emitting element. The illustrated light emitting body is configured to include an acrylic plate (light guide plate) 30, a reflection plate 31 disposed on one side of the acrylic plate 30, and a diffusion plate 32 disposed on the other side of the acrylic plate 30. Each of the light emitting elements 3 and 4 is arranged on one of the side surfaces of the acrylic plate 30, and each light emitting surface is arranged so that light can be emitted toward the inside of the acrylic plate 30. Here, although omitted for convenience of illustration, it is assumed that each side surface of the acrylic plate 30 is provided with a reflective film. The light emitted from each light emitting element 3, 4 is repeatedly reflected inside the acrylic plate 30, and finally passes through the diffusion plate 32 and exits from the other side of the acrylic plate 30. At that time, the light emitted from each light emitting element 3, 4 is mixed by the reflection due to the reflection plate 31 and by the diffusion due to the diffusion plate 32, and the color tone of the light emitted from the other side of the acrylic plate 30 becomes a mixture of the respective color tone of each light. That is, the emission color of each of the light emitting elements 3 and 4 is mixed by an appropriate reflecting surface and a light diffusing surface, and the emitted light can exit from the same emission surface.

As will be described in detail later, when emission color tone of light emitting element 3 shifts from the original white color to close to a yellow color due to a decrease in the current flowing through the light emitting element 3, by having the emitted light to be mixed with the blue color light emitted from the light emitting element 4, it is possible to correct the mixed light color to become closer to a white color. From this point of view, it is desirable for the emission color of the light emitting element 4 to be in a complementary color relation to the emission color of the light emitting element 3 to which is caused to shift and become closer due to a decrease in current. In this embodiment, as the light emitting element 4, there is used a light emitting element that emits a blue color which is in a complementary color relation to a yellow color which is the emission color of the light emitting element 3 that is caused to become closer to when shifted.

Figure 4:
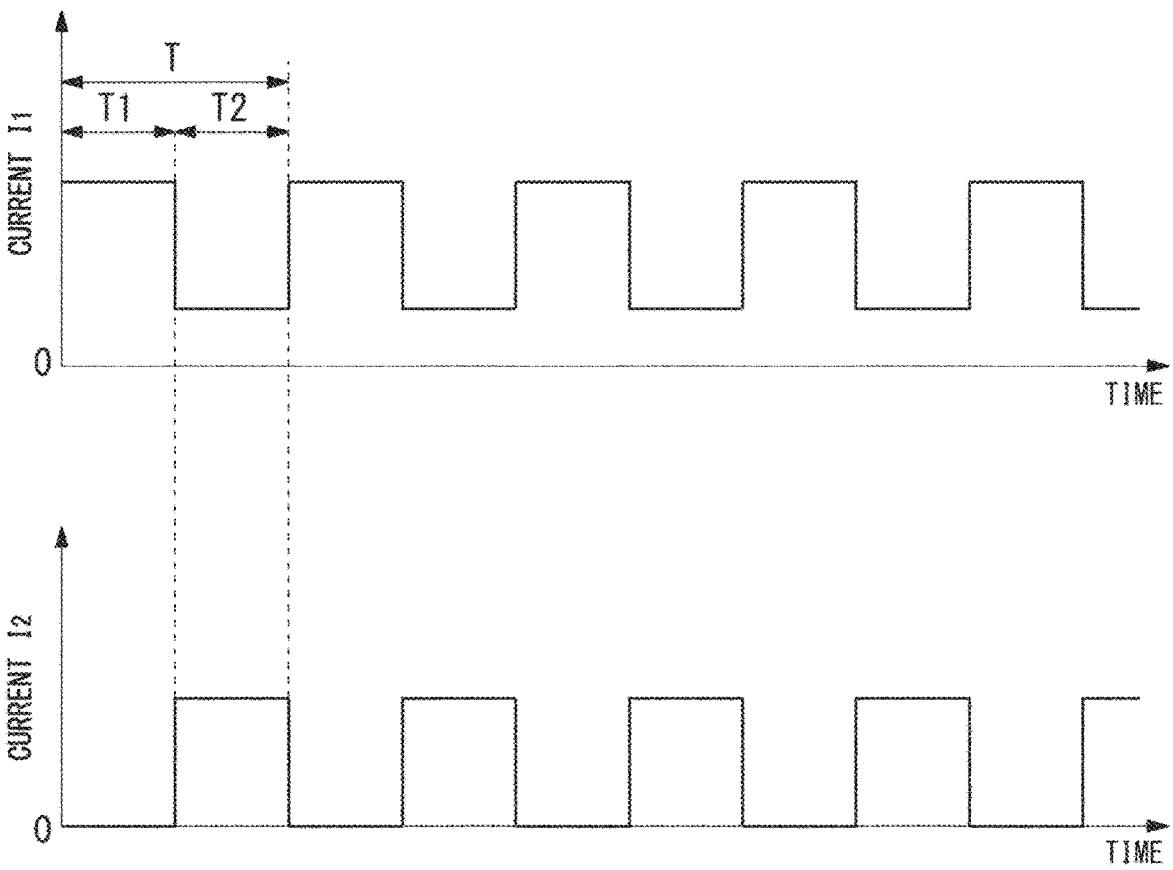
FIG. 4 are waveform diagrams that explains current flowing through each light emitting element.

FIG. 4 are waveform diagrams that explains current flowing through each light emitting element. In the figure, the upper waveform diagram is a waveform diagram of current $I_1$ flowing through the light emitting element 3, and the lower waveform diagram is a waveform diagram of current $I_2$ flowing through the light emitting element 4. As shown in the figure, in the present embodiment, the light emitting element 3 is driven so that one cycle T which includes period T1 in which a relatively large current flows and period T2 in which a relatively small current flows is caused to occur repeatedly. This cycle T is set to a length corresponding to several tens of hertz to several hundred hertz, for example, and the light emitted from the light emitting element 3 is perceived by a human eye as substantially continuously lit light. In the illustrated example, a case is shown in which the lengths of period T1 and period T2 are equal (duty ratio of 50%). In this way, by performing driving in which the lengths of period T1 and period T2 are set variably (that is, PWM driving), effective brightness of the light emitting element 3 can be controlled. However, since current $I_1$ becomes small during period T2, as described above, a phenomenon occurs in which the emission color of the light emitting element 3 shifts from a white color and becomes close to a yellow color.

On the other hand, in this embodiment, during period T2 when current $I_1$ of the light emitting element 3 is relatively small, current $I_2$ flows through the light emitting element 4 to compensate for this. As a result, blue light is emitted from the light emitting element 4. Then, by mixing the blue light from the light emitting element 4 with the white light (white color light shifted toward yellow color light side) from the light emitting element 3, it is possible to correct the mixed color of the combined light so that it becomes close to a white color.

Here, note that in the example shown in FIG. 4, current $I_2$ during period T1 is 0, but current $I_2$ during period T1 may be greater than 0. However, it is assumed that the magnitude of current $I_2$ during period T1 is set relatively smaller than the magnitude of current $I_2$ during period T2.

Figure 5A:
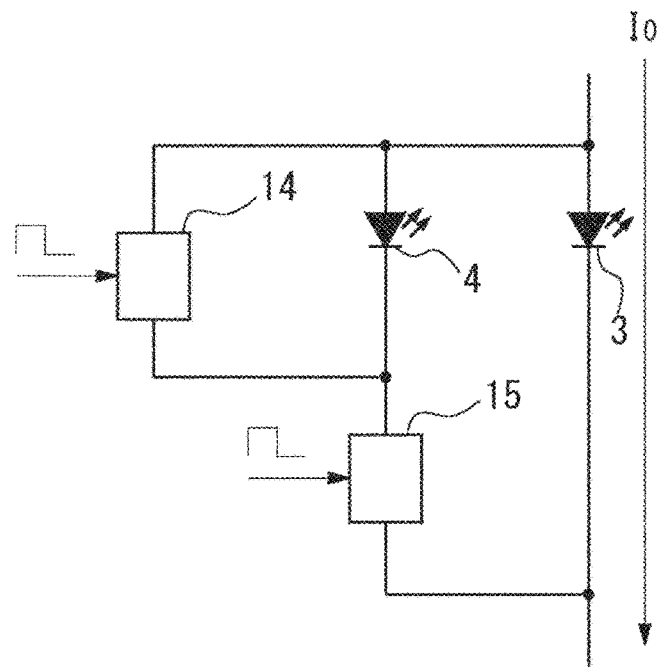
FIG. 5A is a diagram for explaining circuit operation during period T1.

FIG. 5A is a diagram for explaining circuit operation during period T1. During period T1, the constant current circuit 15 is controlled by a pulse signal from the PWM circuit 13 so that at least the constant current circuit 15 is being turned off. In this embodiment, the constant current circuit 14 is further controlled by the PWM circuit 12 so that the constant current circuit 14 is also being turned off. As a result, no current flows through the current path including the light emitting element 4 and the light emitting element 4 becomes a non-conductive state so that total current $I_0$ generated by the drive voltage of the power supply circuit 10 flows to the light emitting element 3. Thereby, the light emitting element 3 emits white color light.

Figure 5B:
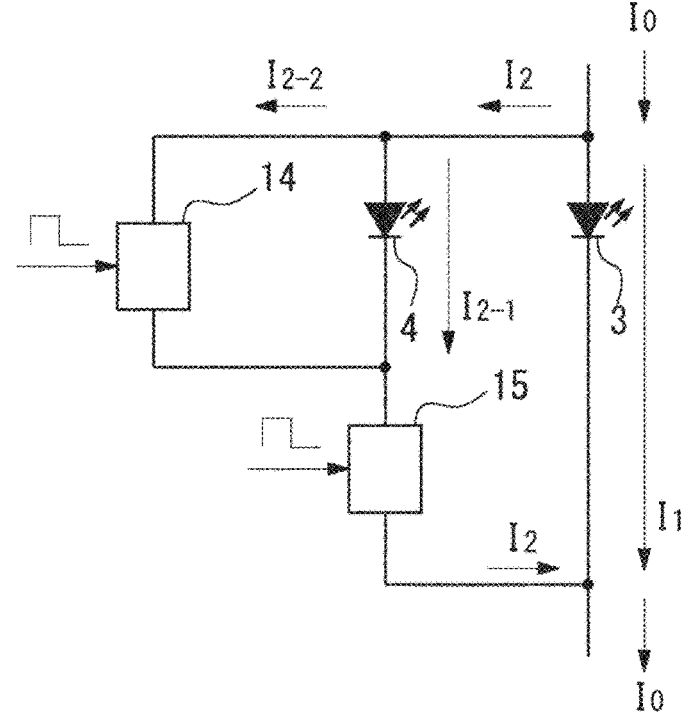
FIG. 5B is a diagram for explaining circuit operation during period T2.

FIG. 5B is a diagram for explaining circuit operation during period T2. During period T2, each of the constant current circuits 14 and 15 are controlled by pulse signals from the PWM circuits 12 and 13 so that both of the constant current circuits 14 and 15 are being turned on. Depending on the current (constant current) flowing through the constant current circuit 15, total current $I_0$ is divided into current $I_1$ and current $I_2$ at a predetermined ratio. The light emitting element 3 is supplied with current $I_1$ that is relatively smaller than total current $I_0$, and emits light according to the magnitude of current $I_1$. At this time, the emission color of the light emitting element 3 shifts due to the decrease in current.

Further, current $I_2$ flowing into the current path including the light emitting element 4 is divided into current $I_{2-1}$ and current $I_{2-2}$ depending on the current flowing through the constant current circuit 14 (constant current). Current $I_{2-1}$ flows through the light emitting element 4 and blue color light is emitted from the light emitting element 4 depending on the magnitude of current $I_{2-1}$. As a result, the emission color of light emitting element 4 is mixed with the shifted emission color of the light emitting element 3, and the overall light color is corrected to become closer to a white color. The degree of color tone correction can be adjusted by appropriately setting the brightness of the light from the light emitting element 4 depending on the magnitude of current $I_{2-1}$. Further, current $I_{2-2}$ flows through the constant current circuit 14. Current $I_{2-1}$ flowing through the light emitting element 4 and current $I_{2-2}$ flowing through the constant current circuit 14 joins again to obtain current $I_2$, and this current $I_2$ joins current $I_1$ flowing through the light emitting element 3 to become total current $I_0$, which then flows to the reference potential terminal.

Figure 6:
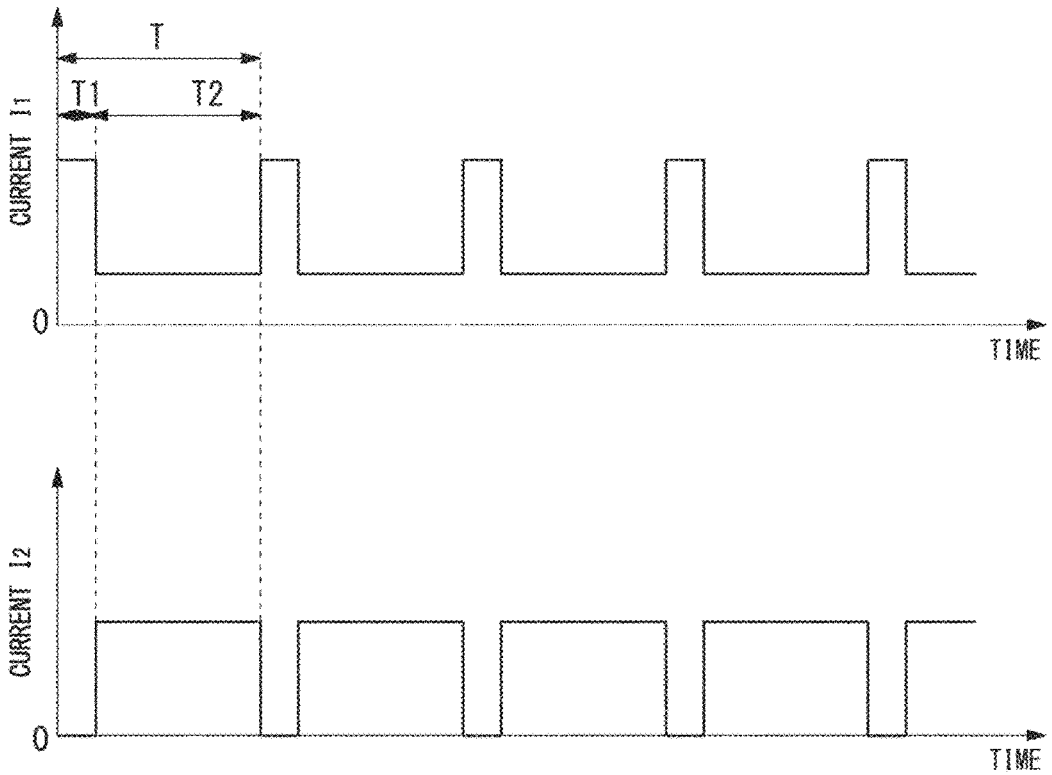
FIG. 6 are waveform diagrams that explains current flowing through each light emitting element.

Here, note that in the example of the waveform diagrams shown in FIG. 4, period T1 and period T2 are the same length (duty ratio 50%), however, as illustrated in FIG. 6, the lengths of both periods can be different. Even in such a case, during period T2 in which current $I_1$ of the light emitting element 3 is relatively reduced, by causing current $I_2$ to flow to the light emitting element 4 in a complementary manner, light control is achieved with little change in color tone (chromaticity) within one cycle T.

Incidentally, in the past, when a light emitting element is PWM controlled, depending on its blinking cycle, the timing of photographing by the camera (exposure timing) and the time when the light emitting element is turned off could overlap, thus there may be a case where it is not possible to photograph the state in which the light emitting element emits light. In recent years, images of the surroundings of a vehicle photographed by a camera are used in various controls, therefore it may be inconvenient to be unable to photograph the state in which the light emitting element emits light. In this regard, in the vehicle lamp of the present embodiment, since light is turned on at a constant current value even during period T2 and images are photographed by a camera in a state where light is continuously turned on, a secondary effect of resolving the above-described inconvenience can also be achieved.

According to the embodiment described above, it is possible to suppress discoloration of color tone of the emitted light in a vehicle lamp (lighting apparatus) using a light emitting element.

Here, note that the present disclosure is not limited to the content of the embodiment described above, and can be implemented with various modifications within the scope of the gist of the present disclosure. For example, the circuit configuration of the embodiment described above is merely an example, and the present disclosure is not limited thereto. For example, there may be adopted a configuration in which a switching element is connected in parallel to the light emitting element 4 and the switching element is caused to switch to "on" (conductive state) and "off" (non-conductive state). Further, in the embodiment described above, one light emitting element is used to correct the color tone of the light emitting element 3, but a plurality of light emitting elements for correction purpose may be provided.

Figure 7:
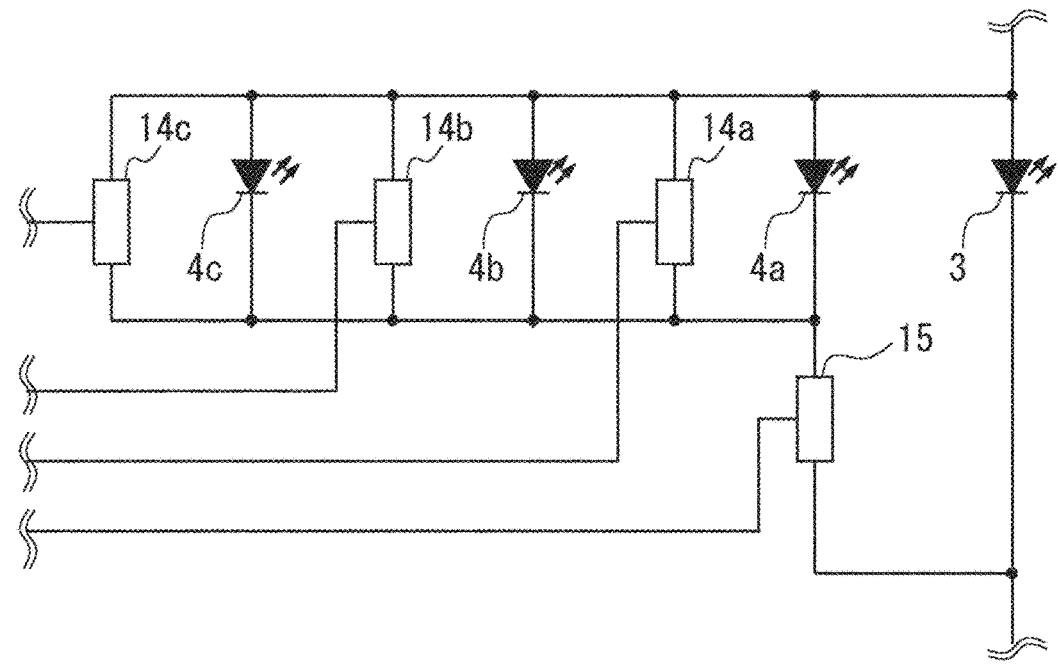
FIG. 7 is an example of a circuit configuration when a plurality of light emitting elements for correction purpose are connected in parallel.

FIG. 7 is an example of a circuit configuration when a plurality of light emitting elements for correction purpose are connected in parallel. In the illustrated example, each light emitting element 4a, 4b, 4c for correction purpose is connected in parallel, and each constant current circuit 14a, 14b, 14c is connected in parallel to each element, respectively. A constant current circuit 15 is connected in series to the light emitting element 4a. Further, although not shown in the figure, a PWM circuit for controlling each constant current circuit 14a, 14b, and 14c is also provided, and a pulse signal is respectively provided to each constant current circuit 14a, etc. In this configuration example, the light emitting elements 4a, 4b, and 4c may emit light of different colors (for example, red, green, blue, etc.), or may emit light of the same color. Further, the light emission timing of each light emitting element 4a, etc. may be the same or different.

Figure 8:
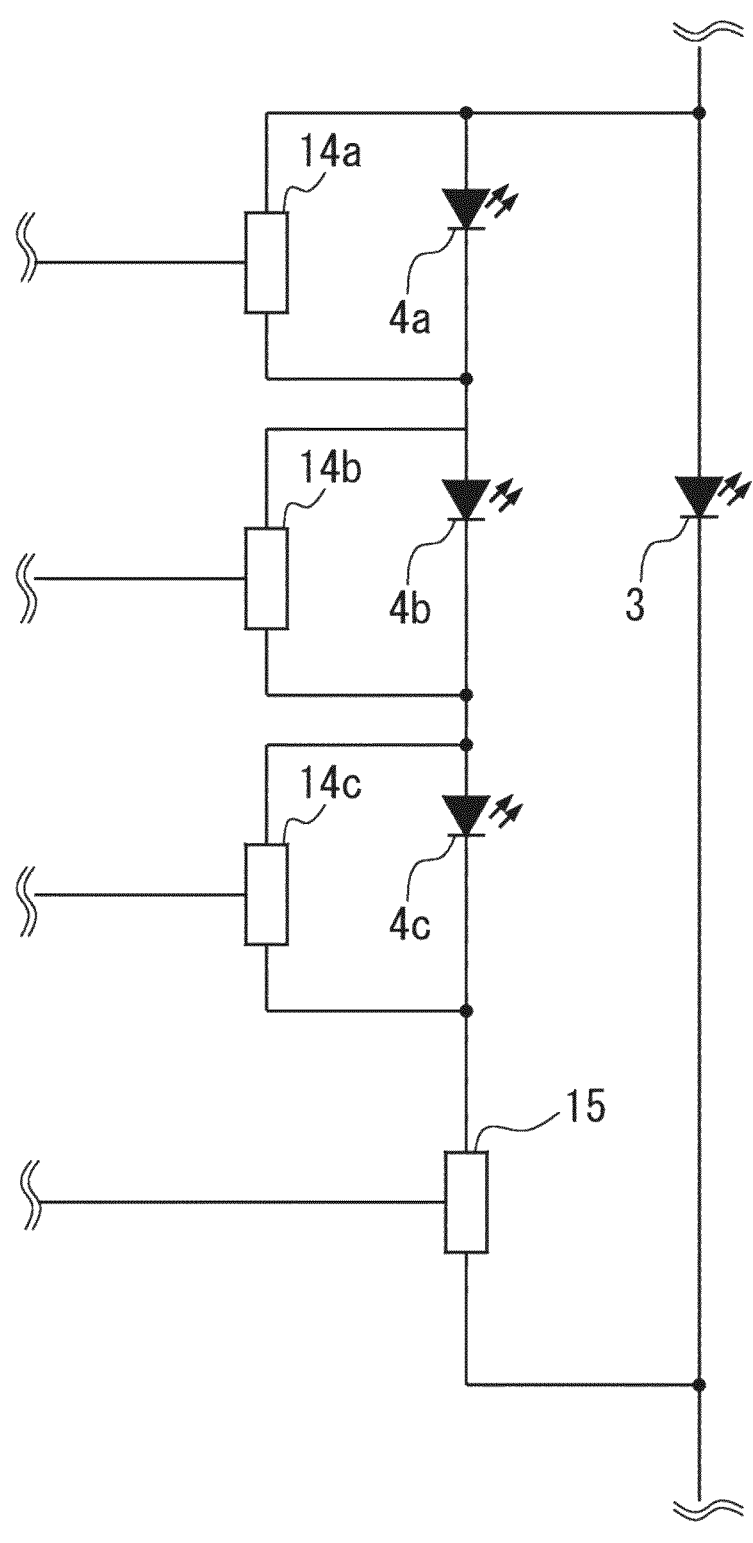
FIG. 8 is an example of a circuit configuration when a plurality of light emitting elements for correction purpose are connected in series.

FIG. 8 is an example of a circuit configuration when a plurality of light emitting elements for correction purpose are connected in series. In the illustrated example, each light emitting element 4a, 4b, 4c for correction purpose are is connected in series, and each constant current circuit 14a, 14b, 14c is connected in parallel to each element A constant current circuit 15 is connected in series to the light emitting element 4c. Further, although not shown in the figure, a PWM circuit for controlling each constant current circuit 14a, 14b, and 14c is also provided, and a pulse signal is respectively provided to each constant current circuit 14a, etc. Also in this configuration example, the light emitting elements 4a, 4b, and 4c may emit light of different colors (for example, red, green, blue, etc.), or may emit light of the same color. Further, the light emission timing of each light emitting element 4a, etc. may be the same or different.

Furthermore, in the embodiment described above, only one light emitting element 3 and one light emitting element 4 are shown, but each of the light emitting element 3 and the light emitting element 4 may be replaced with a light emitting element group consisting of a plurality of light emitting elements. In such a case, each of the light emitting elements in each light emitting element group may be connected in series or in parallel.

Further, in the embodiment described above, an LED is used as an example of a light emitting element, but the light emitting element is not limited thereto, and it may be a laser diode, for example.

Furthermore, in the embodiment described above, a vehicle lamp has been cited as an example of a lighting apparatus, but the content of the present disclosure can be applied to a lighting apparatus in general.

REFERENCE SIGNS LIST

1: Drive circuit
2: Power supply
3, 4: Light emitting element
10: Power supply circuit
11: Controller

8

12, 13: PWM circuit
14, 15: Constant current circuit
The invention claimed is:
1. A lighting apparatus comprising:
at least one first light emitting element;
at least one second light emitting element whose emission color is different from that of the first light emitting element;
a power supply circuit connected to the first light emitting element and the second light emitting element and supplies a driving voltage to the first light emitting element and the second light emitting element; and
a control circuit configured to control flow of a current generated by the drive voltage to each of the first light emitting element and the second light emitting element;
wherein the control circuit is configured to control the flow of the current such that, during a first period, a first current flows through the first light emitting element while the second light emitting element is in a non-conductive state, and to control the flow of the current such that, during a second period which follows the first period, a second current relatively smaller than the first current flows through the first light emitting element while a third current flows through the second light emitting element.
2. The lighting apparatus according to claim 1,
wherein a cycle which consist of the first period and the second period is caused to occur repeatedly, and
wherein the control circuit controls the flow of the current during each of the cycle.
3. The lighting apparatus according to claim 1,
wherein, in the first light emitting element, its color tone of the emission color during the first period shifts to become close to a specific color during the second period, and
wherein, in the second light emitting element, its color tone of the emission color is in a complementary color relation to the specific color.
4. The lighting apparatus according to claim 1,
wherein the first light emitting element and the second light emitting element are connected in parallel,
wherein the control circuit comprises:
a first constant current source connected in parallel to the second light emitting element;
a second constant current source connected in series to the second light emitting element; and
a pulse signal supply circuit configured to generate a pulse signal for switching on/off operation of each of the first constant current source and the second constant current source and supplies the generated pulse signal to each of the first constant current source and the second constant current source.
5. The lighting apparatus according to claim 4,
wherein the pulse signal supply circuit comprises:
a first pulse generation circuit configured to supply the pulse signal to the first constant current source; and
a second pulse generation circuit configured to supply the pulse signal to the second constant current source.
6. A driving method of a lighting apparatus configured to include at least one first light emitting element and at least one second light emitting element whose emission color is different from that of the first light emitting element,
wherein the driving method is configured to control the flow of the current such that,
during a first period, a first current flows through the first light emitting element while the second light emitting element is in a non-conductive state, and to control a flow of a current such that, during a second period which follows the first period, a second current relatively smaller than the first current flows through the first light emitting element while a third current flows through the second light emitting element.

7. A vehicle lamp configured using the lighting apparatus according to claim 1.

* * * * *